F. G. BRIDGER.
POTATO DIGGING MACHINE.
APPLICATION FILED SEPT. 17, 1909.

990,522.

Patented Apr. 25, 1911.

WITNESSES

Frank G. Bridger

INVENTOR

UNITED STATES PATENT OFFICE.

FRANK G. BRIDGER, OF PHELPS, NEW YORK.

POTATO-DIGGING MACHINE.

990,522. Specification of Letters Patent. Patented Apr. 25, 1911.

Application filed September 17, 1909. Serial No. 518,265.

*To all whom it may concern:*

Be it known that I, FRANK G. BRIDGER, a citizen of the United States, residing at Phelps, in the county of Ontario and State of New York, have invented new and useful Improvements in Potato-Digging Machines; and I do hereby declare the following to be a full and accurate description of the said improvements.

The improvements constituting the invention herein described are applicable to that class of potato-digging machines commonly drawn by horses, as distinguished from those operated by hand, and the chief objects of the said improvements are the following: first, to more completely separate and remove the earth from the potatoes; second, that the potatoes, having been cleaned, may be deposited in narrow, compact rows rather than scattered widely, thus greatly lessening the labor of gathering the potatoes; and third, to reduce the draft, or power required to draw the machine.

The accompanying drawings illustrate the mechanism by means of which these results are obtained.

Figure 1:
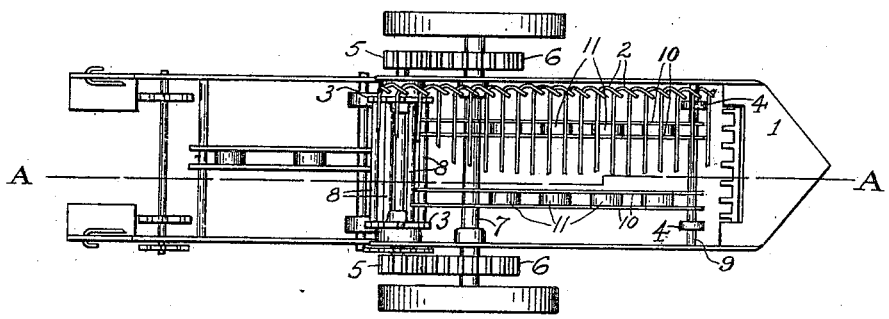
Figure 2:
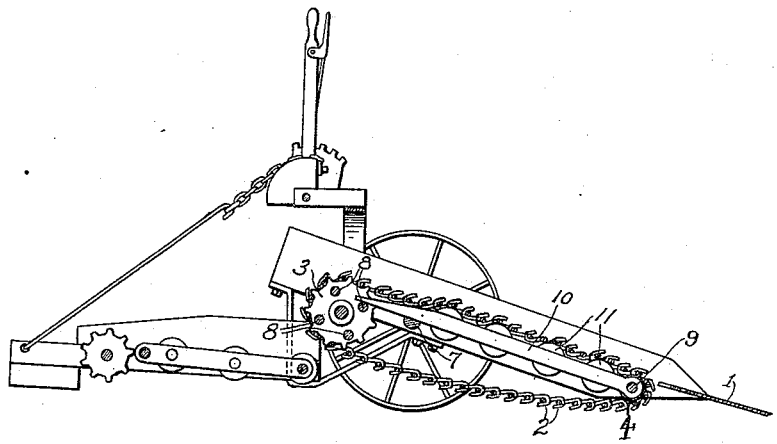

Figure 1 is a plan view of the improvements as applied to a potato-digging machine of the class above designated, showing only so much of the latter as is necessary to make clear the relation between the original machine and the improvements herein described, and omitting, also for the sake of clearness, certain parts of the said improvements, these parts being shown in another view. Fig. 2 is a sectional view taken on the plane indicated by the broken line in Fig. 1.

Similar characters refer to similar parts in both views.

In the operation of the machine shown, the shovel 1 passes through the ground underneath the potatoes. The vertical position of the shovel may be regulated so as to cause it to work at various depths beneath the surface of the ground, but the means for accomplishing this are not shown, being no part of the present invention. The earth and potatoes dug up pass from the shovel to the conveyer formed by the bars 2, 2, which at each end are interlinked, thus forming an endless chain passing over the sprocket wheels 3—3 and the rollers 4—4. Motion is imparted to the conveyer through the gears 5—5, the gears 6—6, and the main axle of the machine 7, in a manner known to those familiar with machines of this class.

To the end that the earth that is brought on to the conveyer along with the potatoes may be separated from the potatoes and sifted through the openings in the conveyer, means for shaking or agitating the upper side of the conveyer are provided. Set in the sprocket wheels 3—3 are four transverse bars 8—8—8—8 which are placed at intervals of ninety degrees about the axis of the said sprocket wheels. To the shaft 9 are pivotally fastened the agitator bars 10—10—10—10, the upper ends of these bars resting on one of the transverse bars 8 and dropping successively from one to another of the bars 8—8—8—8 as the sprocket wheels 3—3 are rotated. Mounted between each of the two pairs of bars 10—10, 10—10 are the rollers 11, 11, which constitute one feature of my invention and serve, primarily to lessen the power required to draw the machine and also to increase the agitating motion given to the conveyer bars 2, 2.

In previous potato-digging machines the friction caused by the weight of the bars 2, 2, the earth and the potatoes sliding up the inclined bars 10, 10 has added considerably to the traction power required. The effect of the rollers in reducing this friction is apparent. As will be seen in Fig. 2, the conveyer, in passing over the rollers 11, 11, receives an undulating motion which serves to increase the efficiency of the agitating mechanism in separating the earth from the potatoes.

Having described my invention, what I wish to claim as new and protect by Letters Patent is:

In a potato-digging machine of the class described, a conveyer-trough inclined upwardly and rearwardly, the floor of said conveyer-trough being formed by one side of an endless carrier, said carrier consisting of transverse rods bent and interlinked at their ends to form an endless chain, bars disposed in pairs and inclined upwardly toward the rear of said potato-digging machine, said bars having their lower ends pivotally supported upon a rod extending transversely of the said conveyer-trough, means for supporting and agitating the free upper ends of said inclined bars and the combination with the above named elements of rollers carried by the said pairs of bars and adapted to come into direct supporting contact with the said endless chain at intervals throughout the length of the upwardly and rearwardly moving portion of said endless chain.

FRANK G. BRIDGER.

Witnesses:
SAMUEL S. PARTRIDGE,
ELLA T. BENDER.

Copies of this patent may be obtained for five cents each, by addressing the "Commissioner of Patents, Washington, D. C."